United States Patent [19]

Ward et al.

[11] Patent Number: 4,845,490

[45] Date of Patent: Jul. 4, 1989

[54] ELECTRONIC LOCKING SYSTEM

[75] Inventors: Kathleen E. Ward, Norfolk, Va.; Mary E. Blewitt, South Port, Conn.

[73] Assignee: Emhart Industries, Inc., Indianapolis, Ind.

[21] Appl. No.: 7,844

[22] Filed: Jan. 28, 1987

[51] Int. Cl.[4] .............................................. H04Q 1/00

[52] U.S. Cl. .......................... 340/825.31; 340/825.32

[58] Field of Search .................. 340/825.31, 711, 747, 340/825.32, 286 M, 525, 524; 235/382; 364/146, 189, 400, 403, 130; 70/278

[56] References Cited

U.S. PATENT DOCUMENTS

| | | | |
|---|---|---|---|
| 4,521,645 | 6/1985 | Carroll | 340/525 |
| 4,558,300 | 12/1985 | Goldman | 340/826 M |
| 4,721,954 | 1/1988 | Mauch | 340/825.32 |
| 4,727,369 | 2/1988 | Rode et al. | 340/825.31 |

*Primary Examiner*—Ulysses Weldon

*Attorney, Agent, or Firm*—Carl A. Forest

[57] ABSTRACT

A management apparatus for a locking system includes a computer memory, first computer means for listing in the computer memory the doors having the locks of the system, and second computer means for entering data in the computer memory defining the interrelationships of the doors, which data including the doors of the system which are accessed by other of the doors. A third computer means lists in the computer memory selected ones of the locks of the doors to be operated by each of the keys, and a fourth computer means determines if a path exists according to said data from an outer limit of the locking system to each of the doors selected for operation by the key either directly or via other of the doors selected for operation by the key. Another means determines if an external door or external doors of the system provide access via a path either directly to each of the internal doors or via other of the internal doors of the system to each internal door of the system.

10 Claims, 9 Drawing Sheets

FIG. 1
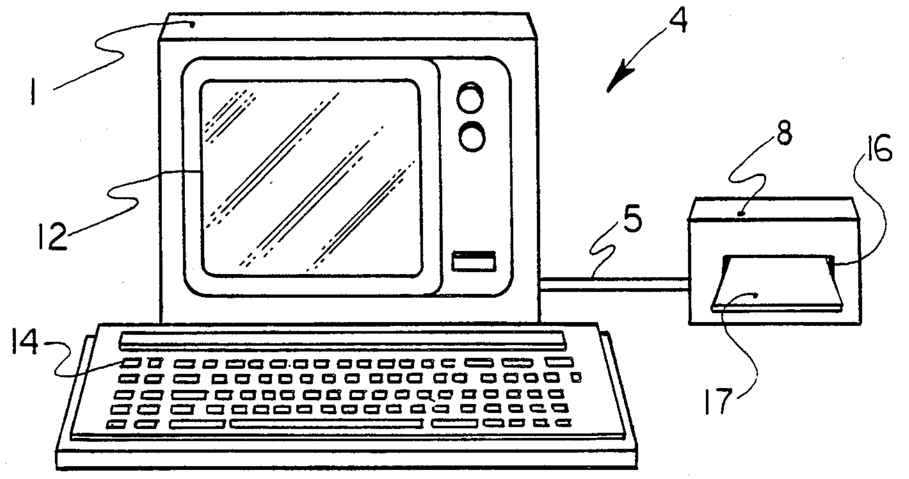
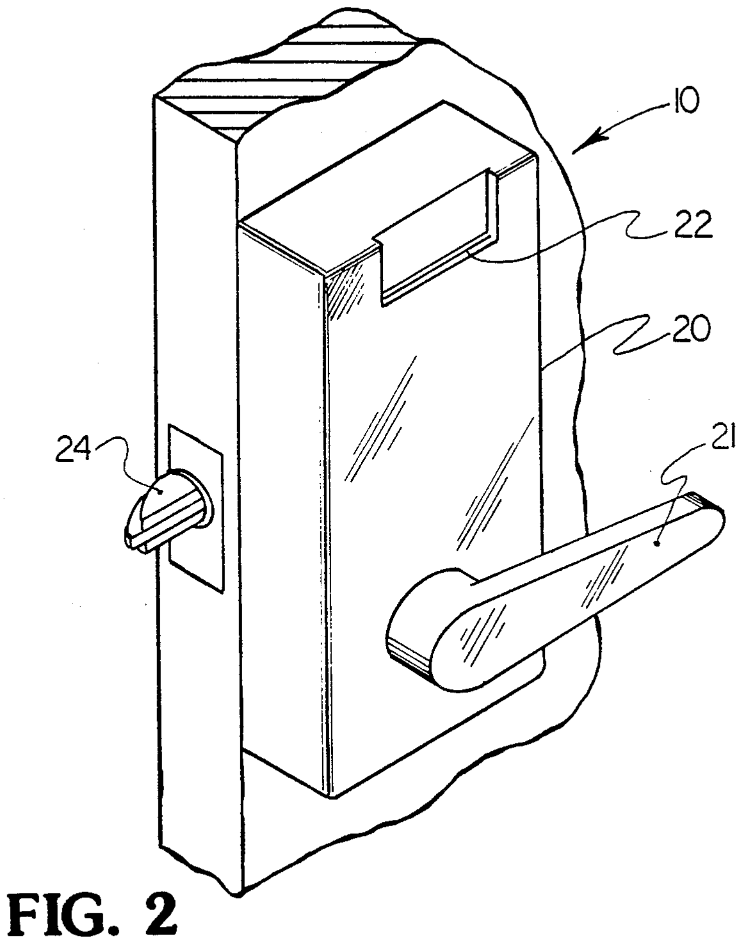
FIG. 2

ELECTRONIC LOCKING SYSTEM

BACKGROUND OF THE INVENTION

The invention relates generally to electronic locking systems and deals more particularly with a management apparatus which participates in the coding of key cards to ensure that a key card provides access through intervening doors to each of the doors having locks selected for operation by the key card.

Electronic locking systems previously known include key cards having magnetic data bits which represent a lock combination, a central computer, a key card encoder for writing data on the key cards, and a multiplicity of electronic locks. Each of the locks is equipped with a reader to read the magnetic data bits on the card and a microprocessor to process the data. If the lock data matches a lock combination stored within the lock, the lock may be opened or updated with a new combination.

Electronic memory in the lock may contain a plurality of the lock combinations associated respectively with a plurality of access levels. For example, in a high security industrial plant, one combination stored in the lock may correspond to a key issued to one employee having a low level security clearance and another combination may correspond to a key issued to another employee having a higher level of security clearance.

In a dormitory building application where there is a locked external door controlling access to the building, a locked internal door controlling access to each floor, and a plurality of locked internal private, dormitory rooms on each floor, it may be desirable that the resident of each dormitory room has a key card which opens the lock of the external door, the lock of one floor door and the lock of one private door leading to one dormitory room. In previously known systems, an operator decides which door lock should be accessible by each key card and then programs a computer to encode the key cards accordingly. However, mistakes occur and occasionally, a key card does not provide access to the desired dormitory room through all intervening doors having the locks.

Accordingly, a general object of the present invention is to provide a management system which facilitates the process of encoding key cards to ensure that a key card provides access through intervening doors to each of the doors having locks selected for operation by the key card.

A more specific object of the invention is to provide a management system of the foregoing type which initially allows an operator to define each of the doors in a building and which doors provide access to which other doors and then verify that a path exists from an external door of the system to each internal door either directly or via other internal doors.

Still another object of the invention is to identify problems of the foregoing types and then assist the operator in correcting the problems.

Still other objects of the invention will become apparent from the following detailed description and claims.

SUMMARY OF THE INVENTION

The invention resides in a management apparatus for a locking system having a plurality of locks mounted on a plurality of doors, and a plurality of keys which operate the locks. The apparatus includes a computer memory, first computer means for listing in the computer memory the doors having the locks of the system, and second computer means for entering data in the computer memory defining the inter-relationships of the doors, which data including the doors of the system which are accessed by other of the doors. A third computer means lists in the computer memory selected ones of the locks of the doors to be operated by each of the keys, and a fourth computer means determines if a path exists according to said data from an outer limit of the locking system to each of the doors selected for operation by the key either directly or via other of the doors selected for operation by the key.

According to another feature of the invention, the apparatus further comprises means for determining if an external door or external doors of the system provide access via a path either directly to each internal door of the system or via other of the internal doors of the system to each internal door of the system.

BRIEF DESCRIPTION OF THE FIGURES

FIG. 1 is a schematic, perspective view of a central computer and a key card encoder of an electronic locking system which embodies the present invention.

FIG. 2 is a schematic, plan view of an electronic lock of the locking system of FIG. 1.

DETAILED DESCRIPTION OF THE PREFERRED EMBODIMENT

Figure 3:
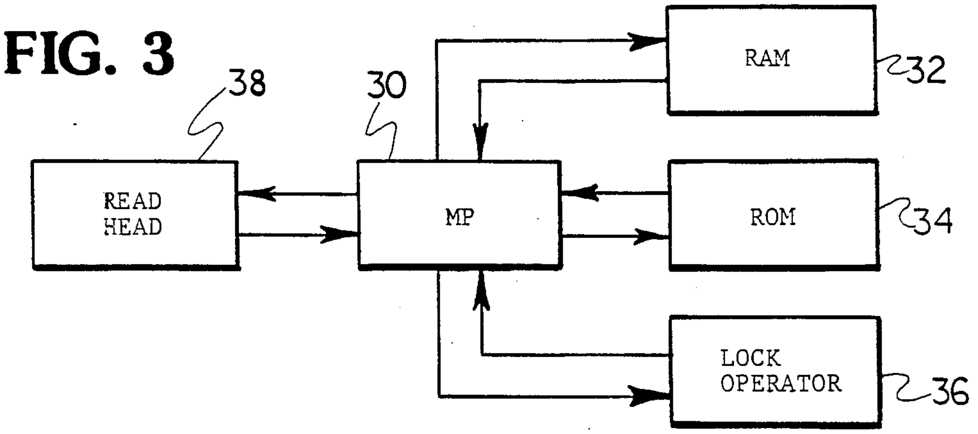
FIG. 3 is a block diagram of electronic circuitry within the electronic lock of FIG. 2.

Turning now to the drawings, FIG. 1 illustrates a computer 6 and a key card encoder 8 of an electronic locking system generally designated 10 which embodies the present invention. The computer 6 is a general purpose, personal computer and includes a video monitor 12 and a keyboard 14. The computer 6 is electrically connected to the encoder 8 via a cable 5 which encoder includes a recess 16 for receiving key cards 17, 17 to be encoded. The encoder 8 also includes components for reading data from the card. Together the computer 6 and the key card encoder 8 form a management system 4.

FIG. 2 illustrates one of a plurality of electronic locks 20 of the electronic locking system 10. The electronic lock 20 includes a recess 22 for receiving the key card 17, electronic components described in more detail below, a latch bolt 24 and a handle 26 for manipulating the latch bolt 24.

FIG. 3 illustrates electronic hardware and firmware within the electronic lock 20 which hardware includes a microprocessor 30, a random access memory (RAM) 32 for storing lock combinations, a read only memory (ROM) 34 for storing an operating program, a lock operator 36 and a read head 38 for reading the key card 17. By way of example, the microprocessor 30 is a Hitachi Model 6305X2. The lock operator 36 includes a solenoid which manipulates a locking mechanism.

Figure 4:
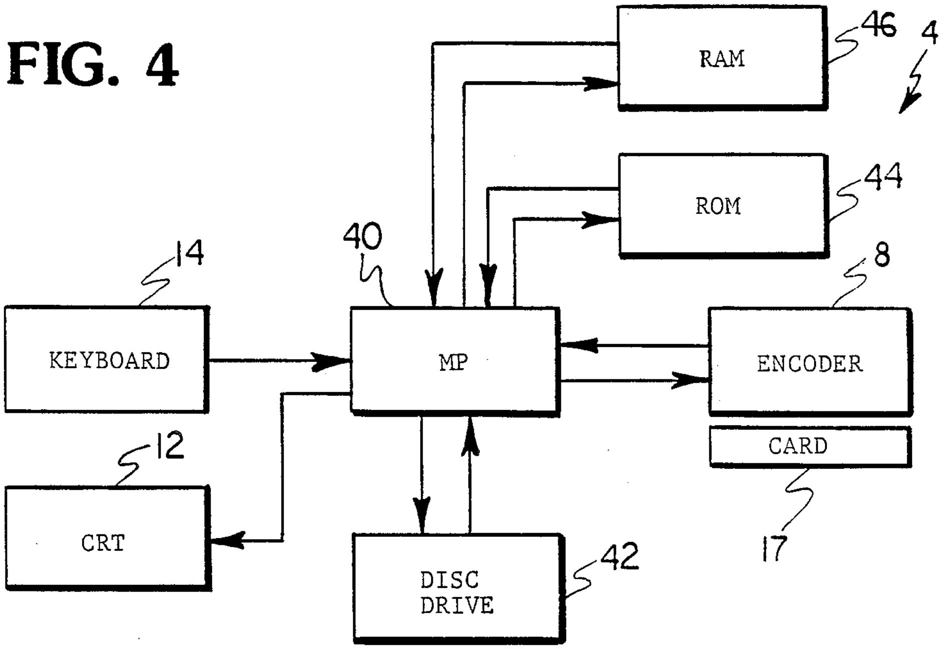
FIG. 4 is a block diagram of electronic circuitry within the computer and card encoder of FIG. 1.

FIG. 4 illustrates components of the management system 4 and their interconnection. The computer 6 includes a microprocessor 40 which is supplied by a disc drive 42, a ROM 44 to provide a portion of the operating program and a RAM 46 to provide working memory. FIG. 4 also illustrates data flowing from the keyboard 14 to the microprocessor 40, from the microprocessor 40 to the video monitor 12 and between the microprocessor 40 and the card encoder 8. Information flows primarily from the microprocessor 40 to the card encoder 8 during writing operations and information flows in the reverse direction during reading operations.

Figure 5:
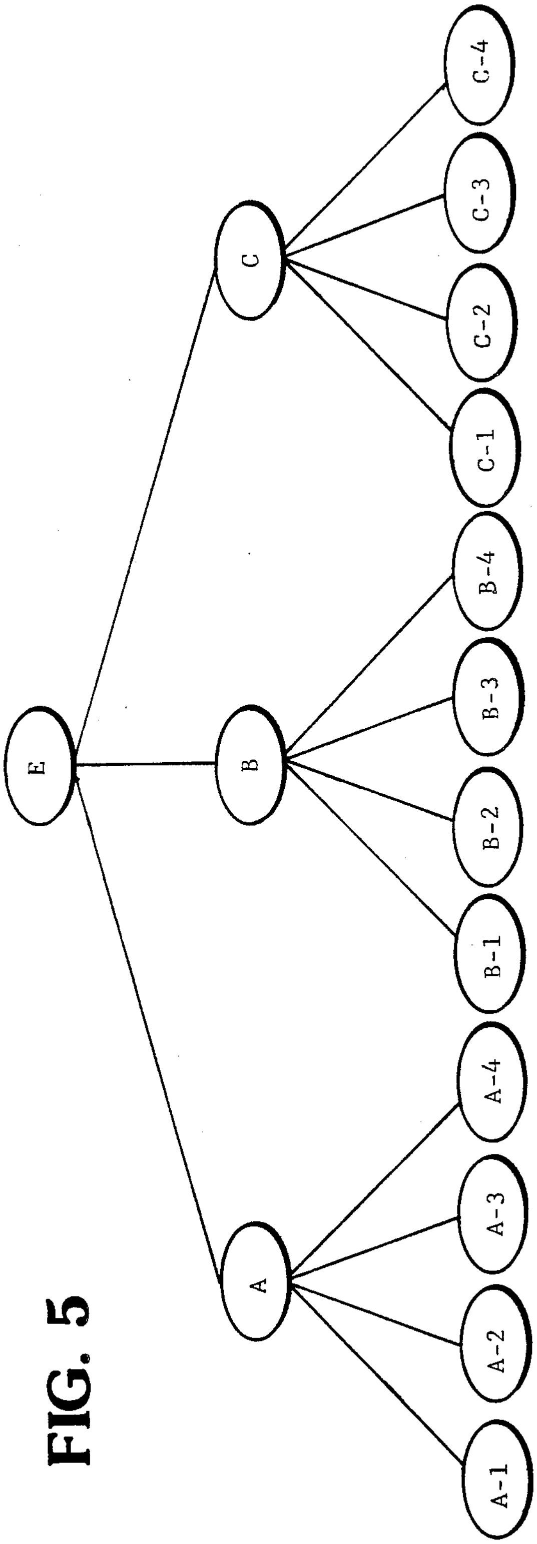
FIG. 5 is a schematic diagram of a floor plan of a building in which the electronic locking system of FIG. 1 may be installed.

FIG. 5 schematically illustrates a dormitory building X having three floors, which building is equipped with the electronic locking system 10. A door E leads from the outside of the building to a hallway and three staircases. The staircases lead to doors A, B, and C forming entrances to floors one, two and three respectively. There are four private dormitory rooms on each floor. The four dormitory rooms on floor one are accessed via doors A-1, A-2, A-3 and A-4. The rooms on floor two are accessed via doors B-1, B-2, B-3 and B-4 and the rooms on floor three are accessed via doors C-1, C-2, C-3 and C-4. Each of the aforesaid doors is equipped with one of the electronic locks 20 as part of the electronic locking system 10. It should be clearly understood that the electronic locking system 10 is flexible enough to serve a wide variety of buildings and floor plans and the floor plan illustrated in FIG. 5 is but one example. For such a floor plan, it may be desirable that the occupant of each room have a key card which provides access through the door E and one of the doors A, B or C and one of the doors to one private dormitory room, and that each key card be unable to access any of the other floor or room doors.

Figure 6:
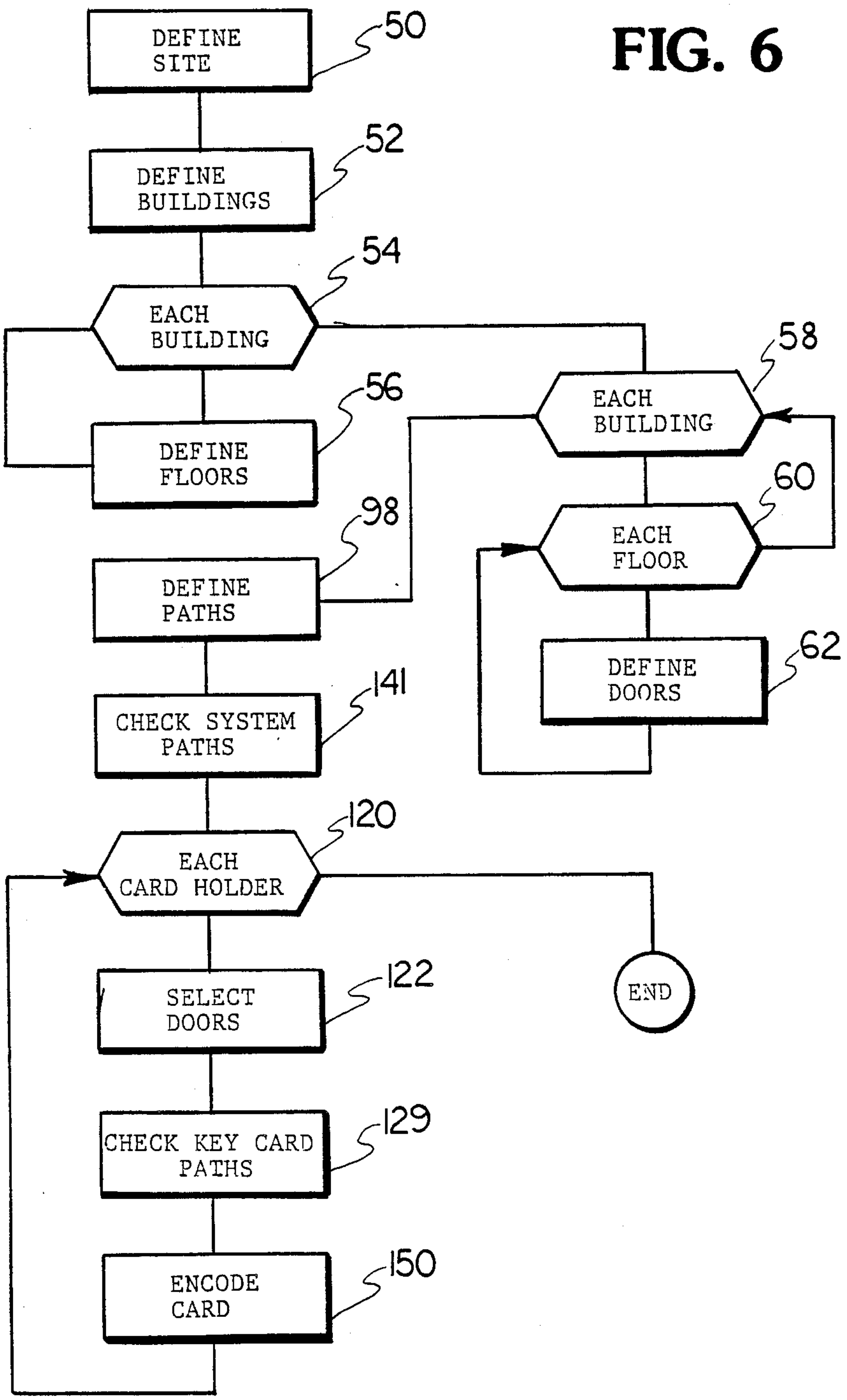
FIG. 6 is a flow chart illustrating a process by which an operator uses the computer of FIG. 1 to define the buildings, floors and doors controlled by the electronic locking system of FIG. 1 and the process by which the computer determines whether viable paths have been defined to provide access to each door defined in the system and to provide access to each door designated by a particular key card.

FIG. 6 is a flow chart 49 illustrating a process by which an operator programs the management system 4 to define the layout of doors having the electronic locks 20, 20 within a building or group of buildings at a site equipped with the electronic locking system 10. First, the operator identifies the site, for example, Green University, by a suitable entry through the keyboard 14 (step 50). Next, the operator identifies each building within the site, for example, Geology building, Gymnasium, and Building X (step 52). Then, for each building (step 54), the operator enters into the computer 6 the name of each floor, for example, Floors A, B, and C of building X (step 56). After the floors of each building have been identified, the operator enters into the computer the name of each door having the electronic lock 20 of each floor of each building (steps 58, 60 and 62), and in the illustrated example, floor one contains doors E, A, A-1, A-2, A-3 and A-4; floor B contains doors B, B-1, B-2, B-3 and B-4; and floor C contains doors C, C-1, C-2, C-3 and C-4.

In addition, in the steps 58, 60 and 62, the operator inputs to the computer the type of each door, internal or external. External doors such as the door E are ones with electronic locks which lead to the outside of the locking system 10 or the outside of the building either directly or through other doors not containing an electronic lock 20 within the system 10. All other doors containing the electronic locks 20, 20 are internal doors.

Figure 7:
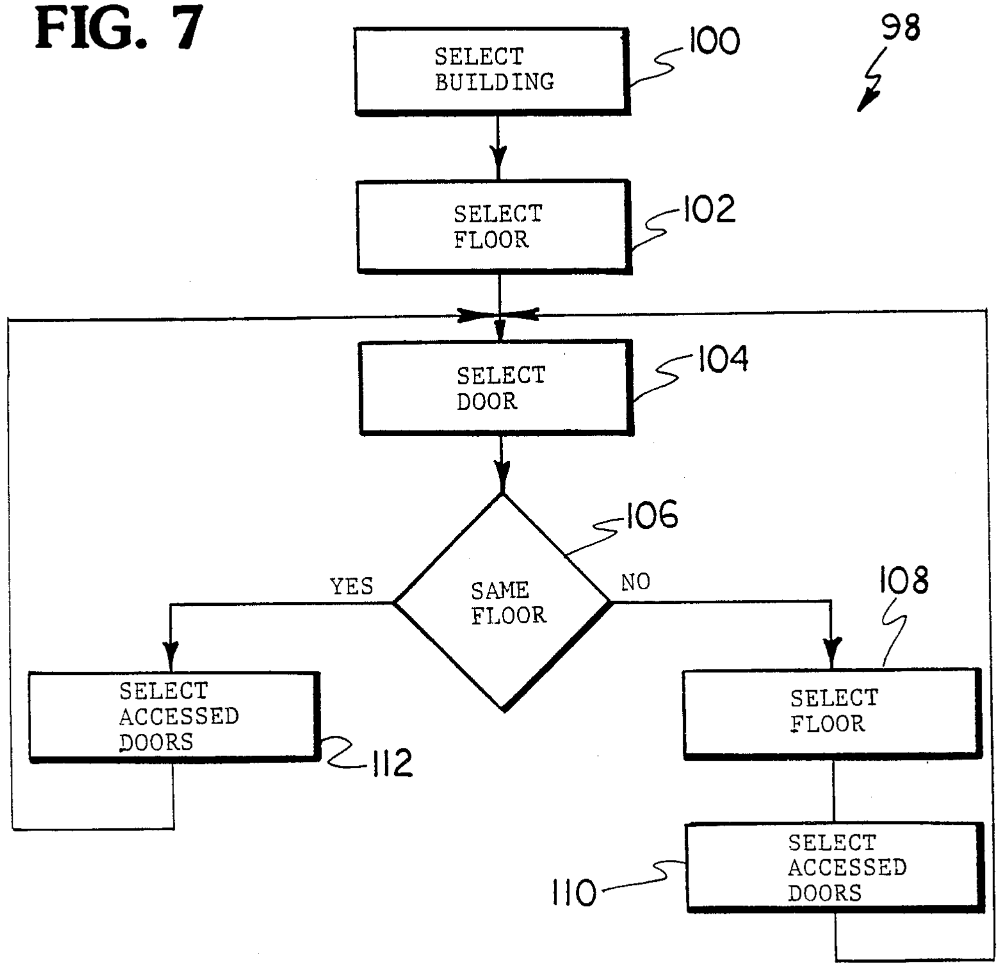
FIG. 7 is a flow chart which forms a portion of the FIG. 6 flow chart and illustrates the specific process by which the operator identifies which doors having electronic locks of the electronic locking system access which other doors having electronic locks.

Next, the operator may define the relationships or path between the doors containing the electronic locks 20, 20, that is, which doors provide access to which other doors (step 98) as shown in more detail in FIG. 7 (steps 100–112). To this end, the operator first selects a building, for example building X by a suitable entry in the keyboard 14 (step 100).

Next, the operator selects a floor, for example floor one of the building X (step 102) and then selects a door, for example door E of the floor one (step 104). Then, the operator may designate which doors having the electronic locks 20, 20 are accessible via door E. In the illustrated example, the operator should designate doors A, B and C as being immediately accessible through the door E. Consequently, the operator enters the door A, and because the door A is also on floor one, the flow chart proceeds from step 106 to step 112 in which the computer notes that door A is immediately accessible via door E. Next, the operator may designate that door B on floor two is immediately accessible via door E with an indication in the keyboard of floor two (step 108) and door B (step 110). In the steps 108 and 110, the operator also designates that door C of floor three is also immediately accessed via door E.

Next, the operator may repeat the steps 104, 106 and 112 to designate all of the doors which are accessed via door A, that is doors A-1, A-2, A-3 and A-4. Then, the operator may repeat steps 104, 106 and 112 for both the doors B and C and the private, dormitory rooms accessed through doors B and C.

After the steps 100–112 have been completed, the computer 6 has an internal map of the paths within each building from the external door to each internal door described by the operator in these steps 100–112. This map resembles the schematic floor plan illustrated in FIG. 5.

After the steps 100–112 have been completed and paths defined from the outside of the building to various doors within the building, the computer executes an algorithm (step 141) to determine if there are certain types of errors in the defined paths. The purpose of the algorithm 141 is to determine whether there is a path from each door designated in step 62 outwardly through doors indicated in step 98 which access the door defined in the step 62 and any other doors which access the accessing doors. In the example illustrated in FIG. 5, the algorithm of step 141 verifies that there are doors having the electronic locks 20, 20 within the system 10 which lead from the external door E through the door A and to the door A-1 and that the path is one of the paths defined in the step 98.

Figure 8:
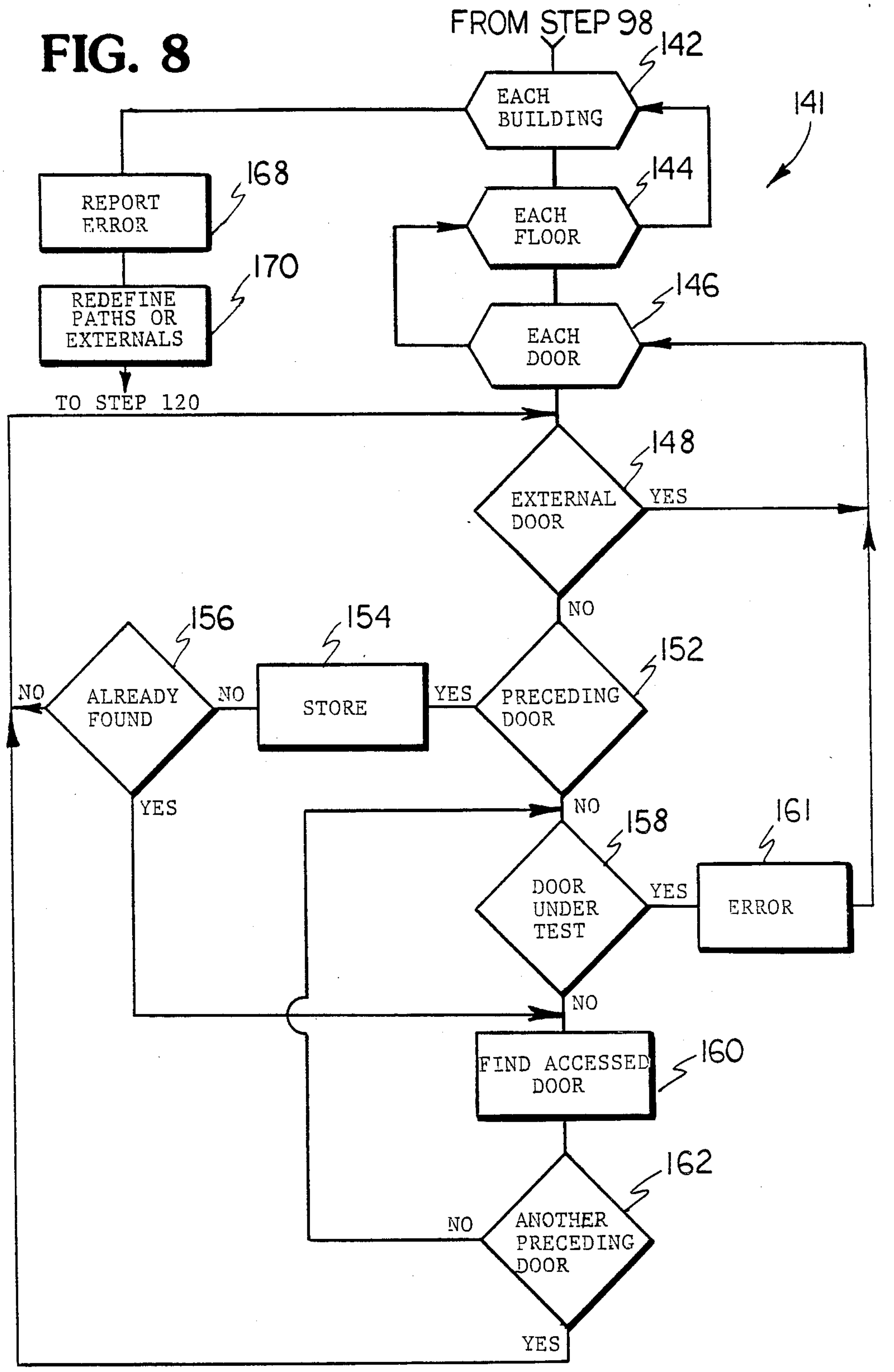
FIG. 8 is an algorithm representing a portion of the FIG. 6 flow chart which algorithm illustrates a process by which the computer determines whether each door identified in the system is accessible via other doors identified in the system according to the paths defined in FIG. 7.

The algorithm of step 141 is illustrated in more detail in FIG. 8 and this algorithm is applied below to the doors E, A and A-1 as examples. According to the algorithm, for each door of each floor of each building (steps 146, 144 and 142) the analysis is made and let us assume that the analysis begins with door E. Because the door E was designated as an external door in step 62, the step 148 leads to the step 146 with no errors noted. In other words, because the door E is an external door, there is necessarily a path leading from the outside of the building or the outer boundary of the locking electronic locking system 10 to it without any intervening doors having the electronic lock 20.

Next, the door A is put to the test of step 148, and because the door A is not an external door, the step 148 leads to the step 152 in which the computer checks its memory to determine whether at least one door was designated in the step 98 as providing access to the door A. In fact, in the step 98, the door E was listed by the operator as providing access to the door A so that the step 152 leads to the step 154 in which the door E is temporarily stored. Next, the computer determines whether the door E was previously indicated by the step 152 in this analysis of the door A (step 156), and because it was not, the step 156 leads back to the step 148 during which the computer determines whether the door E is an external door. Because it is, the step 148 leads back to the step 146 and the analysis of another door within the floor one of building X with no error listed. In other words, because the external door E provides access to the internal door A as indicated in the step 98, there was no error made in the step 98 in defining a path from the outside of the building to the door A.

Next, the door A-1 is put to the pathing test. Because the door A-1 is not an external door, the step 148 leads to the step 152. Because the door A-1 is preceded by the door A and such was indicated in the step 98, the step 152 leads to the step 154 in which the door A is temporarily stored as being a preceding door to the step A-1. Then, the computer determines that the door A was not already considered as a door providing access to the door A-1 during this analysis of paths leading to the door A-1 so that the step 156 leads back to the step 148. Then, in the step 148, the computer determines whether the door stored in the step 154, in the example door A, is an external door. Because it is not, the step 148 leads to the step 152 in which the computer determines if another door was designated in the step 98 as providing access to the door A. Because the door E was so designated, step 152 leads to step 154 in which the door E is temporarily stored. Because the door E was not previously utilized in this analysis of paths leading to the door A-1, the step 156 leads back to the step 148 in which the computer determines that the door E is in fact an external door. Consequently, the computer proceeds back to the step 146 with no error indicated for the door A-1. In other words, the computer has now determined that there is a valid path from the outside of the building to the door A-1 and then, the computer proceeds to perform a similar analysis for the door A-2 because the door A-2 is on the same floor as the door A-1. This analysis is then repeated for the doors A-3 and A-4 and afterwards, the computer performs a similar analysis for the door B and the doors to which it leads B-1, B-2, B-3 and B-4. Then, a similar analysis is made for the door C and the door C-1, C-2, C-3 and C-4.

After the foregoing analyses have been made (steps 142–166), the computer reports to the operator via the display 12 all of the doors to which there is no path leading from the outside of the building or system 10 according to the paths defined in the step 98 (step 168). Then, the operator has the opportunity to correct the problem or problems by either adding a path from the outside of the building or system 10 through intermediary doors containing the locks 20 to the problem door or else designating the problem door as an external door if that is in fact the case (step 170).

Next, the operator has the opportunity to designate the doors through which each card shall provide access. First, the operator may select a particular card holder by name (step 120 of FIG. 6) and then select the doors which the operator intends that the card holder have access (step 122). For example, the operator may decide that a card holder John shall have access through doors E, A, and A-1. In step 122, the computer also randomly generates a lock combination number for John's key card and stores the lock combination in its memory.

Next, the computer performs an algorithm 129 in which it determines for each card designated to be encoded according to steps 120 and 122, whether the card holder will have access to each door designated to be opened by the key card. In the aforesaid example illustrated in FIG. 5, a key card holder John was given access through the doors E, A and A-1 in the steps 120 and 122, and the algorithm 129 is used to determine whether John will have access through all necessary doors leading to the doors E, A and A-1 in order to fully utilize his key card.

Figure 9:
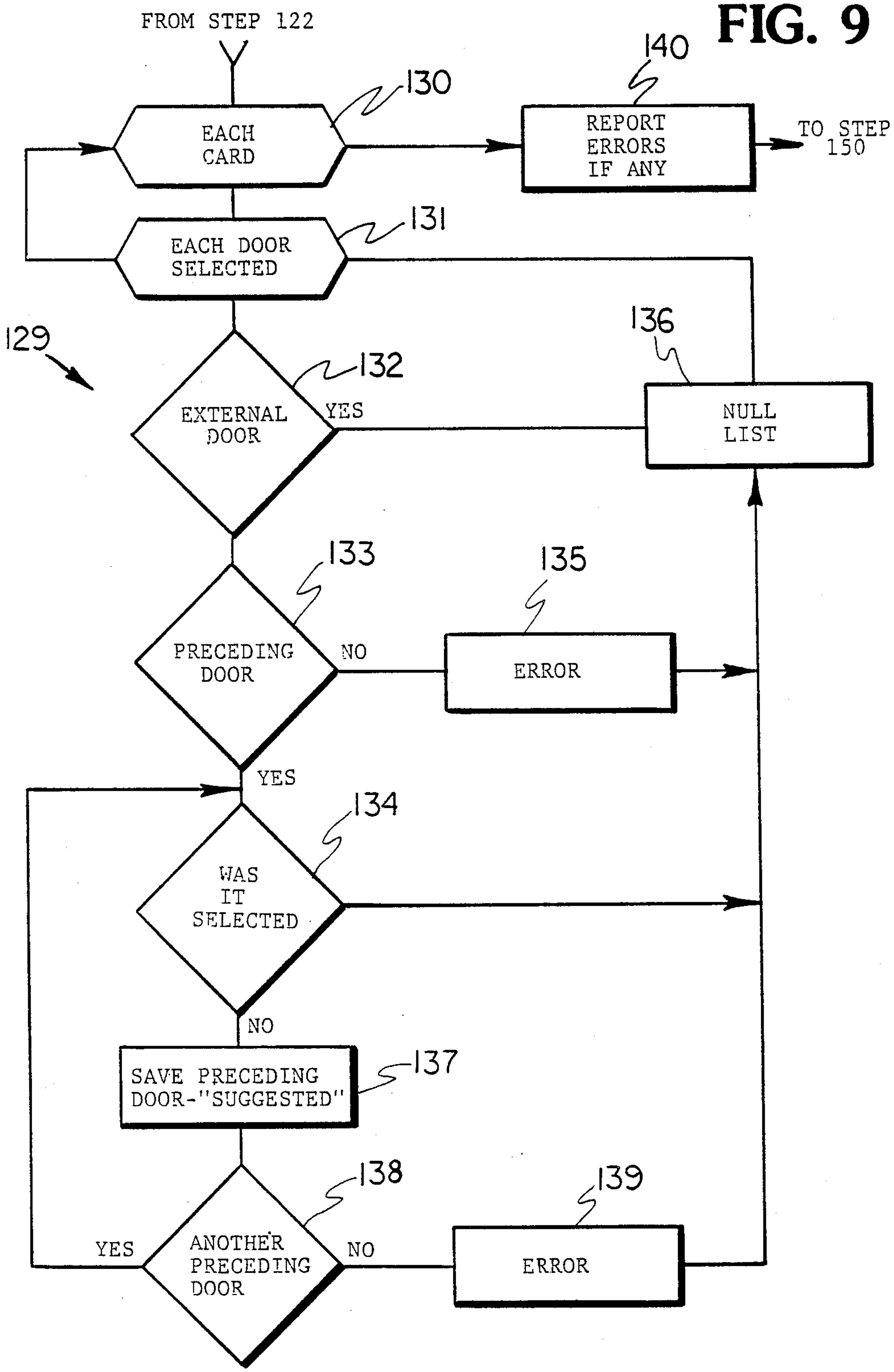
FIG. 9 is an algorithm which forms a portion of the FIG. 6 flow chart and illustrates a process by which the computer determines whether each door designated by a perspective key card is accessible via other doors designated by the key card.

The algorithm 129 is illustrated in more detail in FIG. 9. For John's card (step 130), the computer considers each door in sequence. Considering first the door E (step 131), the computer determines whether the door E is an external door (step 132). Because it is, the computer proceeds to the step 136 in which it nulls the door E from the list of doors indicated for John's key card and does not indicate any error. In other words, John will have no problem using the key card in gaining access to the door E because door E is an external door.

Next, the computer considers the door A planned for John's key card (step 131) and because the door A has not previously been designated as an external door in the step 62 the computer proceeds from step 132 to the step 133. In the step 133, the computer determines whether the operator designated a preceding door in the step 98, one which provided access to the door A, and because door E was so designated, the computer proceeds to the step 134. It should be noted that if there was no preceding door identified in the step 98 as providing access to the door A, then the step 133 would lead to the step 135 and an error noted because there would not be any access from the outside of the building to the door A.

In the step 134, the computer determines whether John's key card has been designated to contain a combination granting access through the door E, and because this is so, the computer proceeds back to the step 136 in which it nulls the door A from its checklist without indicating any error. In other words, there is no problem in John's key card providing access through the door A because it provides access through the door E.

Next, the computer performs the analysis for the door A-1 which was designated by the operator in steps 120–122 as being accessible via John's key card. Because the door A-1 is not an external door, the computer proceeds from the step 132 to the step 133 in which the computer recognizes that the preceding door A was designated in the step 98 as providing access to the door A-1. Because the door A was selected in the steps 120 and 122, the computer proceeds from 134 to the null list 136 without noting an error in the programming of John's key card to provide access through the door A-1. At this time, the computer has completed all of the tests for the doors through which John's key card is designated to provide access and then proceeds to the next key card to be issued.

As another example, let us assume that Mary was designated in the steps 120, 122 to have a key card which provides access through the doors E and B-1 only. The analysis for the door E proceeds through the steps 131, 132 and 136 without problems. However, when the computer analyzes the door B-1, it first notes that the door B-1 is not an external door (step 132), and then proceeds to the step 133 in which it determines that the door B is in fact a preceding door to the door E-1. However, the computer next proceeds to the step 134 in which it determines that the door B was not selected in the steps 120, 122 as a door through which Mary's key card should provide access. Consequently, the step 134 leads to the step 137 in which the computer stores data indicating that the door B provides access to the door B-1. Then, the computer proceeds to the step 138 in which it checks its memory to determine whether another door was selected in the step 98 as providing access to the door B-1. Unfortunately, in this example there was no such other door designated in the step 98 so that the step 138 leads to the step 139 in which the computer notes an error in Mary's key card designation. It should be noted that in the analysis of step 138, if there was another door identified in the step 98 which provided access to the door B-1, then the step 138 would lead to the step 134 in which the computer determines whether this other door was selected by the operator in steps 120 and 122, in which case, there would be no error as a path would lead from the outside of the building to the door B-1.

After each of the respective key card designations is analyzed in the steps 130–139, the computer reports any errors (step 140) on the video monitor 12. In the report, any doors listed in the step 137 as providing access to the problem door but not previously designated by the operator in the steps 120 and 122 are listed. To correct the problem, the operator may either select one of these "suggested" doors to be accessible with the key card or else designate any problem door as an external door if that is in fact the case and this fact was omitted in the step 62.

Then in step 150, the actual key cards are encoded by the operator inserting a blank key card within the encoder 8, identifying the person who is to obtain the key card and then directing the computer to print the appropriate codes on the card. For more information on the coding technique, reference may be made to a patent application entitled "Electronic Locking System" filed same day herewith by Joseph M. Rollins and incorporated by reference as part of the present disclosure. The process for actually encoding the locks by inserting the encoded key cards in the locks is also described in the aforesaid patent application.

Figure 10:
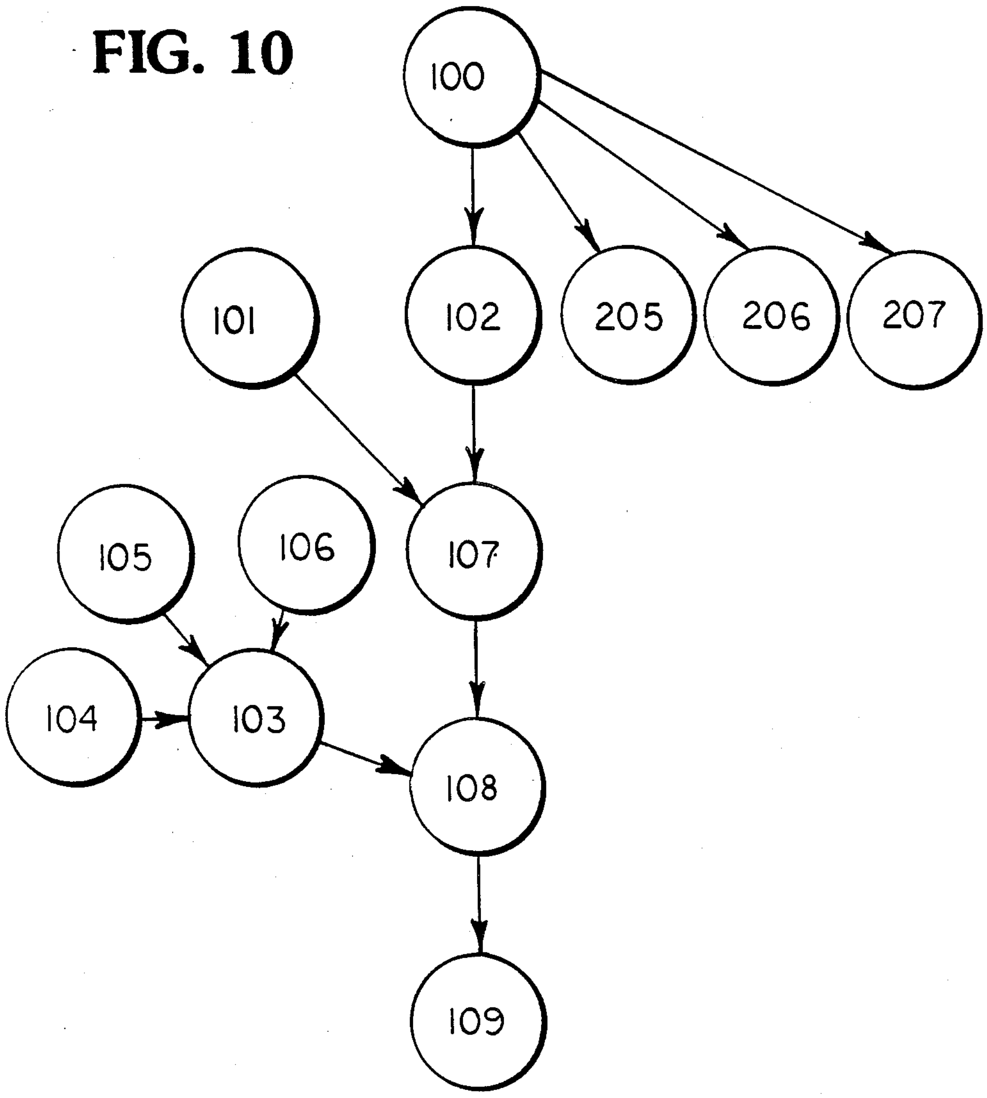
FIG. 10 is a schematic diagram of another floor plan which may be outfitted with the electronic locking system of FIG. 1 and analyzed by the processes of FIGS. 6-9.

FIG. 10 illustrates the floor plan of another building within the electronic locking system 10. Each of the doors illustrated in FIG. 10 contains one of the electronic locks 20 and each of the arrows in the FIG. 10 leads from an accessing door to an accessed door in the manner illustrated in FIG. 5 above. Such paths from accessing doors to accessed doors are defined in the algorithm 98 described above. The floor plan of FIG. 10 is illustrated to further define the algorithm 141, and only certain of the doors will be considered below. It should be noted that the doors in the range 100–109 are on floor one and the doors 205, 206 and 207 are on floor two, that door 100 was designated as an external door in the step 62 and all the other doors were designated as internal doors.

Let us first analyze the system pathing to the door 107. In the step 148, the computer determines that the door 107 is not an external door and so proceeds to the step 152 to determine if there is a preceding door as designated in the step 98. There are two such preceding doors, doors 101 and 102, and the computer first considers the one having the lower numerical tag, door 101 which door tag is stored (step 154). Next, the computer proceeds to step 156 to determine if the door 101 was previously found in the analysis of door 107, and because this is not the case, the computer proceeds to the step 148 to determine whether the door 101 is an external door. Such is not the case according to the step 98 so that the computer proceeds to the step 152 to determine if the door 101 has a preceding or accessing door. Because the door 101 does not have such a preceding door, the computer proceeds to the step 158 in which it determines whether the door 101 is the door currently under test. Because the door 107 is the one currently under test, the computer proceeds to the step 160 in which it re-identifies the door accessed by the door 101, that is the door 107. Then, the computer proceeds to the step 162 in which it determines whether there is another door which accesses the door 107 as defined in the step 98. In this example, the door 102 also accesses the door 107 so that the computer proceeds to the step 148 to determine whether the door 102 is an external door. Because it is not, the computer proceeds to the step 152 to determine whether there is a door which accesses the door 102. Because the door 100 accesses the door 102, the computer proceeds to the step 154 in which it temporarily stores the door 100 and then determines whether the door 100 was previously found in this analysis of the door 107. Because this is not the case, the computer proceeds to the step 148 in which it determines that the door 100 is in fact an external door. Consequently, a valid path has been found from the outside of the building to the door 107 and no error is noted for the door 107.

Consider now the door 101. The computer determines in the step 148 that the door 101 is not an external door and so proceeds to the step 152 in which the computer determines whether, according to the step 98, a door accesses the door 101. Because this is not the case, the computer proceeds to the step 158 in which the computer determines whether the door 101 is the door currently under test. Because this is the case, the computer proceeds to the step 164 and notes an error. In other words, because the door 101 is not an external door and there are no other doors which provide access to the door 101, there is an error.

Similarly, when the computer analyzes the doors 104, 105 and 106, the computer will note that neither of these doors is an external door and no other doors provide access to these doors so that they present a problem.

Considering now the door 103, for each of the accessing doors 104, 105 and 106, the computer will execute an analysis similar to the analysis executed for the accessing door 101 for the door 107 and after noting that none of the doors 104, 105 or 106 is an external door and there are no doors which access the doors 104, 105, 106 the computer will note an error in the paths defined for the door 103.

Considering now the door 108, there is a suitable path via the doors 100, 102 and 107 so that there is no error in the paths defined for the door 108 in the step 98. After the steps 142–162 have been completed, the computer reports in step 168 any errors noted in the step 164 and then the operator has the opportunity to rectify the errors (step 170) either by designating the doors 101, 104, 105 and 106 as external doors or by providing a path from an external door or intervening door to each of the doors 101, 104, 105 and 106. This requires a return to the step 98 and the appropriate further definitions of the paths.

Figure 11:
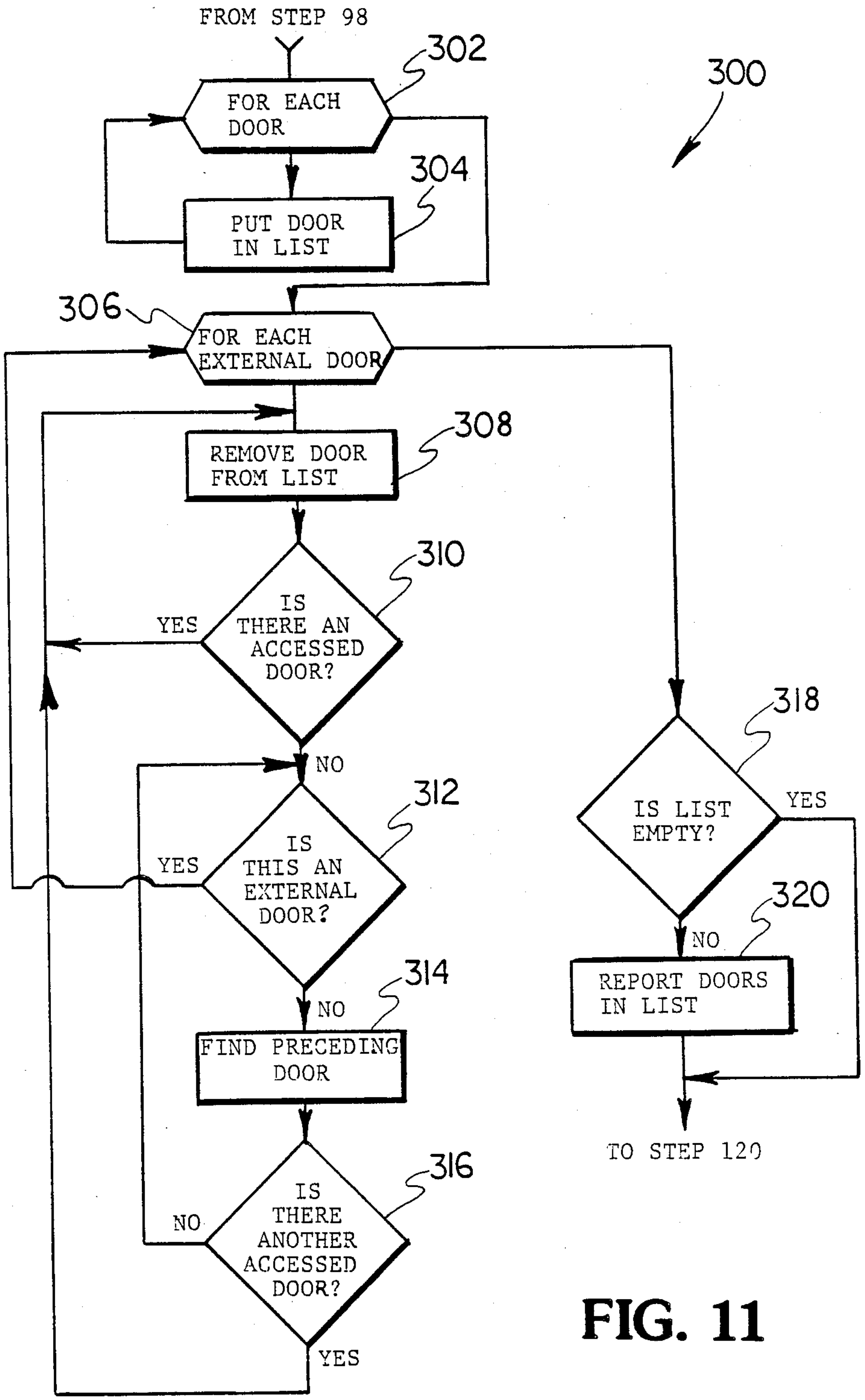
FIG. 11 illustrates an algorithm which is an alternate embodiment to the FIG. 8 algorithm.

FIG. 11 illustrates an alternate embodiment 300 for the algorithm 141 for checking the system paths. In the algorithm 300, first each of the doors identified in the steps 58, 60 and 62 is put in a door list (steps 302 and 304). Then, for each external door (step 306), the computer performs the following test algorithm. First, the external door which in the FIG. 5 example is door E is removed from the list (step 308). Then, the computer reviews its data obtained from the step 98 to determine if there are any doors accessed by the door A (step 310). Because door A (and also doors B and C) is accessed by the door E, the computer moves back to the step 308 to remove door A from the list. It should be noted that when the computer reviews its data to locate the accessed doors, it reviews the accessed doors identified in the step 98 in either numerical or alphabetical order so this explains why the door A was first removed from the list in the step 308. Next, the computer checks its data obtained from the steps 58, 60, 62 and 98 to determine if the door A provides access to any other doors (step 310). The computer then learns of the door A-1 from its memory, and moves back to the step 308 to remove door A-1 from its list and then returns to the step 310 to determine if the door A-1 accesses any other doors. Because this is not the case as illustrated in FIG. 5, the computer proceeds to the step 312 to determine whether the door A-1 is an external door. This is also not the case so that the computer proceeds to the step 314 to identify the door which precedes the door A-1, in the illustrated example, door A. Then, the computer proceeds to the step 316 to determine whether there is another door beside the door A-1 which is accessed via the door A. In the illustrated example, door A-2 is accessed by the door A so that the computer loops back to the step 308 to remove door A-2 from the list. The computer repeats the steps 308–316 for each of the doors A-3 and A-4 in sequence and after coming to the step 316 for the door A-4, the computer notes that the door A-4 does not access any other doors and then loops back to the step 312. Because the door A-2 is not an external door, the computer finds the preceding door A and then proceeds to the step 316 to determine whether the door A accesses any other doors. Because this is not the case, the computer then proceeds to the step 312 to determine whether door A is an external door. Because this is also not the case, the computer then proceeds to the step 314 to locate a door preceding the door A according to the paths defined in the step 98. This door is the door E. Then, the computer proceeds to the step 316 to determine if the door E accesses any other doors. In the illustrated example, the door E accesses the door B so that the step 316 leads to the step 308 in which the door B is removed from the list. Then, the computer repeats the algorithm for the doors B, B-1, B-2, B-3, C, C-1, C-2, C-3 and C-4 and after which, the computer performs step 312 for the door C. Because the door C is not an external door, the computer in step 314 identifies the preceding door E. Because the door E does not access any other doors (316), the computer loops back to the step 312 in which it determines that the door E is in fact an external door and then loops to the step 306 to perform similar analysis for each other external door in the system.

It should be noted that in the aforesaid example, there were no problems with the path definitions, and after the steps 306–316 are executed for each of the external doors in the system, the computer proceeds to step 318 to determine whether the list of doors is empty. If so, there were no problems with the path defined in the step 98 that is, there is at least one path leading to each door identified in the step 98. If there was an error in programming and one or more doors remains in the list, then the computer reports the doors in the list (step 320) to the operator via the video monitor 12, and the operator has the opportunity to either redefine the paths or designate one or more additional doors as being external doors.

By the foregoing, electronic locking systems embodying the present invention have been disclosed. However, numerous modifications and substitutions may be made without deviating from the scope of the invention. Therefore, the invention has been disclosed by way of illustration and not limitation and reference should be made to the following claims to determine the scope of the invention.

We claim:

1. An apparatus for managing a locking system having locks mounted on doors within the system and keys to operate the locks, said apparatus comprising:

- a computer memory,
- means for listing in said computer memory the doors of the system having locks and labeling each door in the list as being either an external door or an internal door,
- means for entering in said computer memory data indicating which of said doors provides access to which other of said doors, and
- means for determining if an external door or external doors of the system provide access via a path indicated by said data either directly to each of said internal doors or via other of said internal doors of the system to each of said internal doors of the system.

2. An apparatus as set forth in claim 1 further comprising:

- means for listing in said computer memory selected locks of said doors of said system to be operated by each of said keys, and
- means for determining if a path exists from an external door or external doors of said system having a lock selected for operation by said key to each internal door having a lock selected for operation by said key either directly by said external door or external doors or indirectly through other of said internal doors having locks selected for operation by said key.

3. An apparatus as set forth in claim 2 further comprising:

means for listing at least some of said internal doors selected for operation by said key to which there is no path leading from an external door of said system selected for operation by said key either directly or via other of said internal doors selected for operation by said key.

4. An apparatus as set forth in claim 1 wherein said means for determining comprises means for tracing a path if it exists according to said data from an external door or external doors of the system either directly to each of said internal doors or via other of said internal doors of the system to each of said internal doors of the system.

5. An apparatus as set forth in claim 1 wherein said means for determining comprises:

second means for determining from said data the doors of the system which access each of the internal doors of said system, and third means for determining if any of said accessing doors is an external door.

6. An apparatus as set forth in claim 5 wherein said means for determining further comprises:

fourth means for determining from said data other of said doors of the system which access said accessing doors, and fifth means for determining if any of the other accessing doors is an external door.

7. An apparatus as set forth in claim 1 wherein said locks are electronic locks, and said keys are key cards.

8. A process for managing a locking system having a plurality of locks mounted on a plurality of doors, respectively and a plurality of keys which operate said locks, said process comprising the steps of:

listing in a memory device the doors of said system having the locks of said system, labeling in said memory device the listed doors which interface to an outer limit of said locking system, inputting data to said memory device indicating which of said doors are accessible by which other doors of said system, listing in said memory device selected ones of said locks of said doors to be operated by a first one of said keys, attempting to locate a path from the outer limit of said locking system to each of said doors selected for operation by said key either directly or through other of said doors selected for operation by said key, and indicating an error when at least one of said doors selected for operation by said key is not accessible from the outer limit of said locking system either directly or via other of said doors selected for operation by said key.

9. An apparatus for managing a locking system having locks mounted on doors within the system and keys to operate the locks, said apparatus comprising:

a computer memory, means for listing in said computer memory the doors of the system having locks, means for entering into said computer memory data indicating which of said doors provide access to which other of said doors, and computer means for determining if some of said doors of the system are not accessible via other of said doors of the system according to said data.

10. An apparatus as set forth in claim 9 further comprises means for presenting information indicating that one of said doors of the system is not accessible from an outer boundary of the system according to said data.

* * * * *